United States Patent
Rieffel et al.

(10) Patent No.: US 8,862,895 B2
(45) Date of Patent: Oct. 14, 2014

(54) SYSTEMS AND METHODS FOR COMMUNICATION, STORAGE, RETRIEVAL, AND COMPUTATION OF SIMPLE STATISTICS AND LOGICAL OPERATIONS ON ENCRYPTED DATA

(75) Inventors: Eleanor Rieffel, Mountain View, CA (US); Jacob Biehl, San Jose, CA (US); Maribeth Back, Woodside, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 736 days.

(21) Appl. No.: 12/768,441

(22) Filed: Apr. 27, 2010

(65) Prior Publication Data

US 2011/0264920 A1  Oct. 27, 2011

(51) Int. Cl.
*G06F 12/14* (2006.01)

(52) U.S. Cl.
USPC .............................. 713/189; 726/26; 380/28

(58) Field of Classification Search
USPC .............................. 713/189; 726/26; 380/28
See application file for complete search history.

(56) References Cited

U.S. PATENT DOCUMENTS

| | | | |
|---|---|---|---|
| 6,826,578 | B2 | 11/2004 | Brackett et al. |
| 8,295,491 | B2 | 10/2012 | Armknecht et al. |
| 8,510,550 | B2 | 8/2013 | Westhoff et al. |
| 8,515,058 | B1* | 8/2013 | Gentry ............................ 380/28 |
| 2004/0003278 | A1* | 1/2004 | Chen et al. .................... 713/200 |
| 2004/0083217 | A1 | 4/2004 | Brackett et al. |
| 2007/0140479 | A1* | 6/2007 | Wang et al. ..................... 380/30 |
| 2007/0171050 | A1* | 7/2007 | Westhoff et al. ......... 340/539.22 |
| 2008/0212780 | A1* | 9/2008 | Lemma et al. ................. 380/277 |
| 2010/0135494 | A1* | 6/2010 | Armknecht et al. .......... 380/270 |
| 2010/0146299 | A1* | 6/2010 | Swaminathan et al. ...... 713/189 |
| 2011/0110525 | A1* | 5/2011 | Gentry .......................... 380/285 |
| 2011/0154016 | A1* | 6/2011 | Niccolini et al. ............. 713/150 |
| 2011/0211692 | A1* | 9/2011 | Raykova et al. ................ 380/46 |

FOREIGN PATENT DOCUMENTS

| | | |
|---|---|---|
| JP | 2007-018506 A | 1/2007 |
| JP | 2009-005828 A | 1/2009 |
| WO | 2008/131787 A1 | 11/2008 |
| WO | 2009/152829 A1 | 12/2009 |

OTHER PUBLICATIONS

Rafail Ostrovsky et al. "Private Searching on Streaming Data" Journal of Cryptology, vol. 20:4, pp. 397-430, Oct. 2007. http://www.cs.ucla.edu/~rafail/PUBLIC/Ostrovsky-Skeith.pdf.*

(Continued)

*Primary Examiner* — Beemnet Dada
*Assistant Examiner* — Thomas Gyorfi
(74) *Attorney, Agent, or Firm* — Sughrue Mion, PLLC

(57) ABSTRACT

Systems and methods provide for a symmetric homomorphic encryption based protocol supporting communication, storage, retrieval, and computation on encrypted data stored off-site. The system may include a private, trusted network which uses aggregators to encrypt raw data that is sent to a third party for storage and processing, including computations that can be performed on the encrypted data. A client on a private or public network may request computations on the encrypted data, and the results may then be sent to the client for decryption or further computations. The third party aids in computation of statistical information and logical queries on the encrypted data, but is not able to decrypt the data on its own. The protocol provides a means for a third party to aid in computations on sensitive data without learning anything about those data values.

20 Claims, 7 Drawing Sheets

(56) References Cited

OTHER PUBLICATIONS

Craig Gentry. "Computing Arbitrary Functions of Encrypted Data." © 2008 ACM (8 pages) http://crypto.stanford.edu/craig/easy-fhe.pdf.*

Aldar C-F Chan. "Symmetric-Key Homomorphic Encryption for Encrypted Data Processing" IEEE International Conference on Communications 2009 (Jun. 14-18, 2009) (5 pages) http://ieeexplore.ieee.org/stamp/stamp.jsp?tp=&arnumber=5199505.*

Caroline Fontaine et al. "A Survey of Homomorphic Encryption for Nonspecialists" EURASIP Journal on Information Security vol. 2007 (10 pages) http://downloads.hindawi.com/journals/is/2007/013801.pdf.*

D. Boner et al., Evaluating 2-DNF Formulas on Ciphertexts. In Proceedings of Theory of Cryptography (TCC) '05, LNCS 3378, pp. 325-341, Apr. 2, 2006.

C. Castelluccia et al., Efficient and Provably Secure Aggregation of Encrypted Data in Wireless Sensor Networks. ACM Transactions on Sensor Networks, vol. 5, No. 3, pp. 20:1-20:36, May 2009.

C. Fontaine et al., A Survey of Homomorphic Encryption for Non-specialists. EURASIP Journal on Information Security, vol. 2007, Article ID 13801, pp. 1-10, 2007.

C. Gentry, Fully homomorphic encryption using ideal lattices. In Proceedings STOC '09, pp. 169-178, May 31-Jun. 2, 2009.

Chida, K., An Algebraic Privacy Homomorphism Based on Factoring and Its Applications, Technical report of IEICE. ISEC vol. 103 No. 315, pp. 53-60, Sep. 2003.

Morohashi, G., Cross Tabulation Protocol Hiding Individual Information, pp. 483-488, Oct. 2006.

Rieffel, E. And Biehl, J., Secured histories: computing group statistics on encrypted data while preserving individual privacy, pp. 2-14, Dec. 2010.

Zhan, J., Matwin, S. and Chang, L., Privacy-Preserving Collaborative Association Rule Mining, pp. 153-165, Aug. 2005.

Domingo-Ferrer, J. A Provably Secure Additive and Multiplicative Privacy Homomorphism, pp. 471-483. Sep. 2002.

Notification of Reasons for Refusal corresponding to Patent Application No. 2010-208994 dated May 13, 2014.

* cited by examiner

SYSTEMS AND METHODS FOR COMMUNICATION, STORAGE, RETRIEVAL, AND COMPUTATION OF SIMPLE STATISTICS AND LOGICAL OPERATIONS ON ENCRYPTED DATA

BACKGROUND

1. Field of the Invention

This invention relates in general to methods and systems involving operations on encrypted data, and more specifically to communication, storage, retrieval, and computation of operations on encrypted data.

2. Description of the Related Art

Various trends in computing and data storage, including cloud computing, are resulting in more and more companies choosing to outsource many of their computational needs to third party data and computation providers. There is a tension, however, between the security of outsourced data and computation and flexibility in handling that data. For this reason, there is a strong desire to be able to encrypt data in such a way that computations can be performed on the encrypted data without needing to first decrypt the data. Researchers have been looking for means to meet this desire for many years, but the general problem has proven difficult. Recent breakthroughs have led to progress in this area, but much work remains to be done to provide practical solutions for even relatively simple cases.

Homomorphic encryption is one technique being used to combat this problem. Almost all homomorphic encryption techniques use asymmetric (i.e. public key) encryption as their base. Asymmetric encryption is orders of magnitude slower to encrypt and decrypt than symmetric encryption, and requires data expansion during encryption to achieve security. Castelluccia et al. (C. Castelluccia, C. Chan, E. Mykletun, and G. Tsudik, Efficient and Provably Secure Aggregation of Encrypted Data in Wireless Sensor Networks. ACM Transactions on Sensor Networks, Vol. 5, No. 3, pp. 20:1-20: 36, 2009, herein incorporated by reference in its entirety) recently developed a homomorphic encryption scheme based on symmetric encryption in the context of aggregation in a wireless sensor network. The scheme described in Castellucia et al. provides faster and more compact homomorphic encryption than is possible using a public key-based scheme. Moreover, because of the relative simplicity of the Castellucia et al. scheme, it is able to provide a strong proof of security.

Castelluccia et al. applied its homomorphic encryption scheme to the problem of data aggregation in a wireless network. However, their application involved a fixed computation and no storage.

SUMMARY

Embodiments of the invention involve a protocol that uses the one time pad based symmetric homomorphic encryption of Castelluccia et al. in a different context. The protocol provides the means for performing more general computation on stored data, unlike Castelluccia which does not involve stored data. Like Castelluccia, both protocols guard against "trusted, but curious" third parties, i.e. an aggregator or a third party service provider, that although trusted to carry out instructions involving the encrypted data, may nevertheless be curious and try to learn something from the data that the primary parties would like to keep secret.

Systems and methods described herein provide a homomorphic encryption system and methods for managing encrypted data, including storage, retrieval and computation of encrypted data stored outside of a private network. In one embodiment, the system provides encrypted data to a public network, such as a third party cloud service network, or a third party within a private network, which does not have the capability to decrypt the encrypted data. The third party may store the encrypted data and/or perform calculations on the encrypted data, and may then send the encrypted data and performed calculations to a public or private network where a user has the capability to decrypt and view the data.

In one aspect of the invention there is provided a system for storing and conducting logical operations on sets of encrypted data. The system may involve a storage system storing encrypted data, wherein the encrypted data is encrypted by symmetric homomorphic encryption; and a computation engine that contains a processor. The computation engine may utilize the processor to conduct at least one logical operation on the encrypted data stored in the storage system to produce an encrypted result. The encrypted result can thereby be decrypted by either a single key or a set of keys.

Additional aspects of the invention include a method for storage and conducting of logical operations on encrypted data in a third-party system. The method may involve receiving encrypted data, wherein the data is encrypted using symmetric homomorphic encryption; storing the encrypted data at a storage system in the third-party system; and utilizing a processor in a computation engine in the third-party system to conduct at least one logical operation to produce an encrypted result. The encrypted result is decryptable by either a single key or a set of keys.

Additional aspects of the invention include a system for storing and operating on encrypted data. The system may include a data storage system; and a computation engine. The data storage system receives a plurality of sets of data encrypted by homomorphic encryption and the computation engine executes a process based on the received instructions. The process, being conducted by a processor, may involve selecting at least two sets of encrypted data and performing a logical operation on the selected sets of encrypted data based on the received instructions to produce an encrypted result. The encrypted result is decryptable by either a single key or a set of keys.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. Specifically.

DETAILED DESCRIPTION

Figure 1:
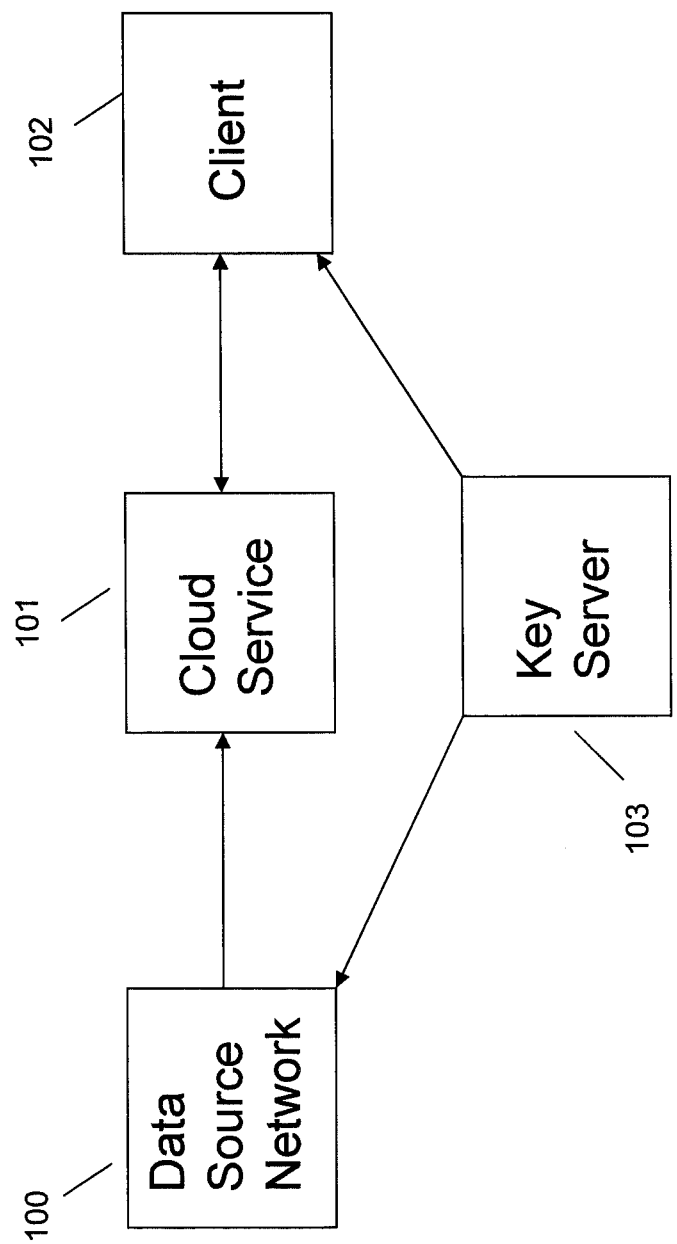
FIG. 1 illustrates a block diagram of a system architecture for managing encrypted data, according to one embodiment of the invention.

In the following detailed description, reference will be made to the accompanying drawings. The aforementioned accompanying drawings show by way of illustration, and not by way of limitation, specific embodiments and implementations consistent with principles of the present invention. These implementations are described in sufficient detail to enable those skilled in the art to practice the invention, and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

The system, according to one embodiment of the invention, uses a symmetric homomorphic encryption protocol as described in Castelluccia et al. to support storing, retrieving, and computing on encrypted data stored off-site. Thus, the system described in this embodiment of the invention both differs from and meaningfully extends the past work in that this embodiment handles computations on arbitrary subsets of stored encrypted data. Past work was limited in scope to developing methods for communicating securely and performing a fixed aggregation of data subject to small bandwidth constraints. In particular, nowhere in the past work is there any storage of data.

In one embodiment, the system is able to guard against a "trusted, but curious" third party; i.e. a service provider that is trusted to carry out instructions on the encrypted data, but which may be curious enough to try to learn something from the encrypted data. The third party may be part of the same organization as one or more of the primary parties, or may be an outside entity such as a service provider. One goal is to prevent the curious service provider from learning anything about the data while still allowing the service provider to aid in the computation of answers to a variety of statistical and logical queries.

Pseudorandom Functions

A pseudo-random function family consists of collections $F_\lambda = \{f_s\}$ of functions indexed by a security parameter $\lambda$. A function $f_s$ is a function from $\lambda$ bits to $\lambda$ bits, $f_s: \{0,1\}^\lambda \to \{0,1\}^\lambda$. A cryptographic grade pseudo-random function (PRF) has the property that seeing polynomially many values of the function is of negligible help in predicting any further value. There exist provably secure PRFs, but they are too slow to be practical. Instead, embodiments of the invention can use keyed hash functions such as Hash-based Message Authentication Code (HMAC). To improve the randomness, and thereby the security, the keyed hash function can be combined with a non-cryptographic grade hash function h that, for example, partitions the $\lambda$-bit output of $f_s$ into length $\mu$ substrings and adds them together: $h: \{0,1\}^\lambda \to \{0,1\}^\mu$. In general, the hash function h must have a uniform output distribution, but does not need to be collision resistant.

A One-Time Pad Based Symmetric Homomorphic Encryption Scheme

This section describes the one-time pad based scheme of Castelluccia et al. Their scheme is for a sensor network with a sink, Set up: Choose $M \geq N*T$, where N is the number of sensors and T is the number of possible sensor values. For simplicity of explanation, it is assumed that all sensors have the same number of possible sensor values, but it is easy to adjust the scheme in a non-uniform case. Messages are encoded as m-bit strings where $m = \log(M) = n+t$ for $n = \log(N)$ and $t = \log(T)$. A pseudorandom function family $F_\lambda = \{f_s: \{0,1\}^\lambda \to \{0,1\}^\lambda\}$ is established, and a $\lambda$ value is chosen according to desired security preferences. In one embodiment, the value $\lambda = 80$ is a common choice for high security. A hash function $h: \{0,1\}^\lambda \to \{0,1\}^m$ also needs to be established. This hash function does not need to be a cryptographically secure function, i.e. it does not need to be collision resistant; it only needs to have uniform output upon uniform input. Finally, a nonce scheme must be agreed upon; nonces do not need to be secret or random, but must not recur (or can only recur with extreme infrequency). One typical way to set nonces is as time stamps.

Key generation: A random $\lambda$-bit string K may be chosen as a key for the sink. Each sensor node i receives from the sink an encryption key $ek_i = f_K(i)$.

Encryption: A message $m_i$ is encrypted by node i as $c_i = m_i + h(f_{ek_i}(r)) \bmod M$. The expression $h(f_{ek_i}(r))$ will be referred to as a pad. A header containing a node ID i is sent, followed by the ciphertext $c_i$.

Aggregation: A node aggregates a set of ciphertexts into an aggregate ciphertext c by adding them together mod M.

Decryption: Decryption of an aggregate of one or more ciphertexts can be accomplished in three steps. From the header, the node IDs contributing to the aggregate are determined. The pads for all these IDs are then computed using h, the pseudorandom function, and the nonce: $h(f_{ek_i}(r)) \bmod M$. All of these pads are added together and subtracted from the aggregate ciphertext c, resulting in m, the sum of the corresponding plaintext messages $m_i$.

The security of this scheme rests on the security of the pseudorandom function family $F_\lambda$. A similar approach can be used to yield a multiplicatively homomorphic scheme. Unfortunately, the two schemes do not encrypt in the same way and so cannot be put together to yield a fully homomorphic scheme.

Exemplary System Architecture

A high-level system architecture according to one embodiment of the invention will now be described. In this embodiment, some portions of the system reside in a private network, some on the public internet, and some in a third party such as a cloud service provider.

FIG. 1 illustrates a basic architecture of a homomorphic encryption system which provides means to store, retrieve and compute on encrypted data, according to an embodiment of the invention. Data sources from a Data Source Network 100 send encrypted data to a Cloud Service 101, which may store the encrypted data and conduct logical operations on the encrypted data based on requests from the client 102. A Key Server 103 may be used to forward encryption keys to both the client and the Data sources, while the Cloud Service 101 is excluded.

Figure 2:
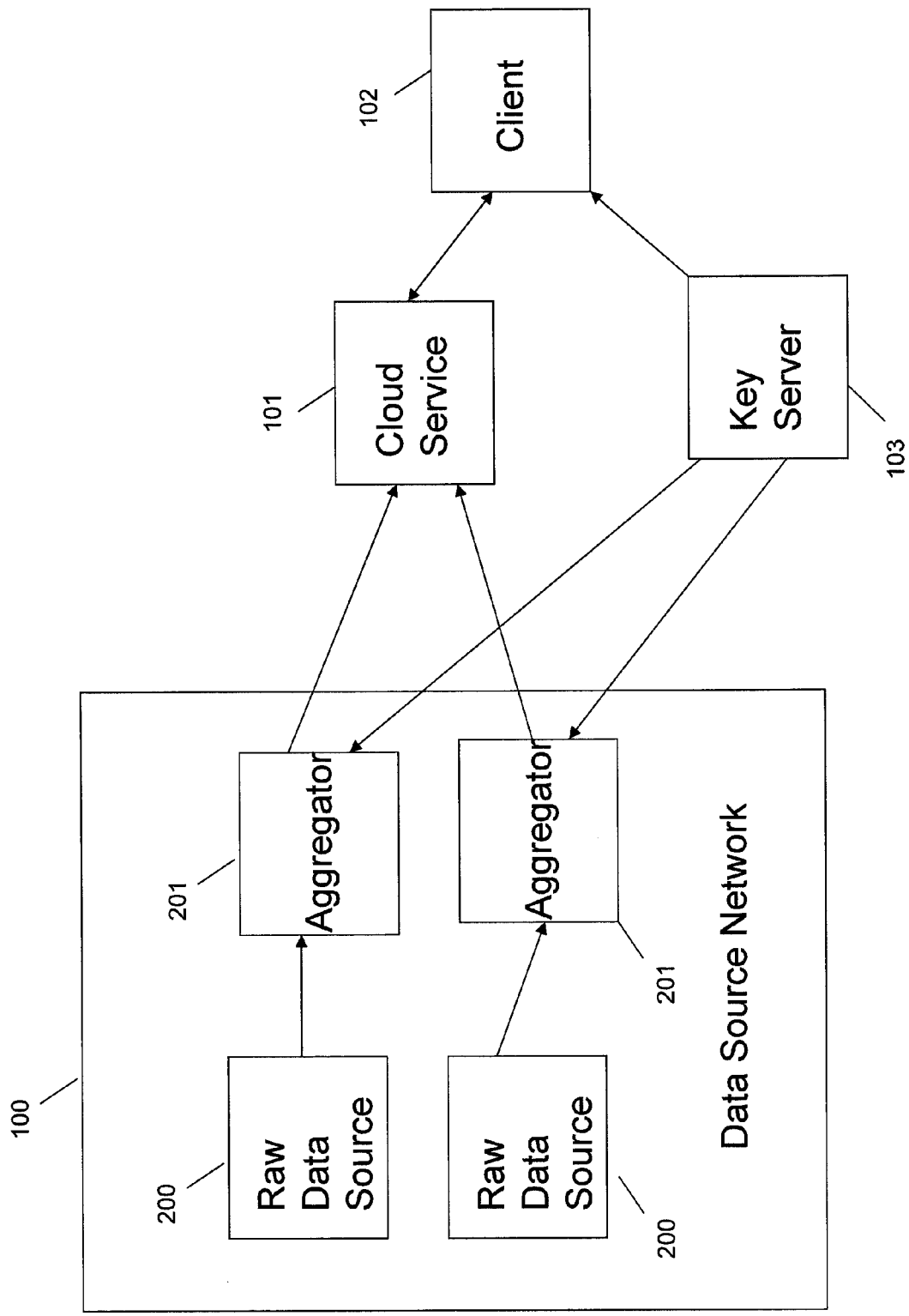
FIG. 2 illustrates a block diagram of a data source network, according to one embodiment of the invention.

FIG. 2 illustrates a data source network according to an embodiment of the invention. The data source network 100 may be public or private. A raw data source 200 sends raw data along with possible metadata, such as source ID or timestamp, to the aggregators 201. Communication in the data source network 200 is secured, in one way or another: for example, the data source network 200 may be part of a secured private network, or a channel which carries the data may be physically secure (short distance wireless signal inside physically secured area), or the communications may be encrypted. There may be several methods of securing communication channels in the data source network 200, but the concern is only whether communication is secured at this point, not how it is secured.

In one embodiment, an aggregator 201 receives the raw data and processes it so as to send along only what needs to be stored. For example, aggregators that process video feeds from sensors may only send descriptions of behaviors/events observed, rather than the raw video stream. This processing by the aggregator 201 helps prevent raw data from the sensors from being used for unintended purposes. Once the aggregator 201 has processed the sensor information, it encrypts resulting data using a homomorphic encryption scheme and sends the data along with a header to a third party, such as a server in a cloud service, as will be described further below.

The key server 103, as shown in FIG. 2, generates a master key which is used to encrypt and decrypt data. In one embodiment, the key server 103 distributes encryption keys $ek_i$ to each aggregator 201, and may distribute the master key or a set of encryption keys to a plurality of computation engines on private networks (see FIG. 4), from which the computational engines on the private networks can compute decryption pads. The key server 103 also distributes either the master key or a set of encryption keys to any client computational component outside of a private network. Alternatively, encryption can also be conducted in a centralized fashion, such as through the use of an archive encryption engine that encrypts all of the data. Such an encryption engine may use different keys for different data.

Figure 3:
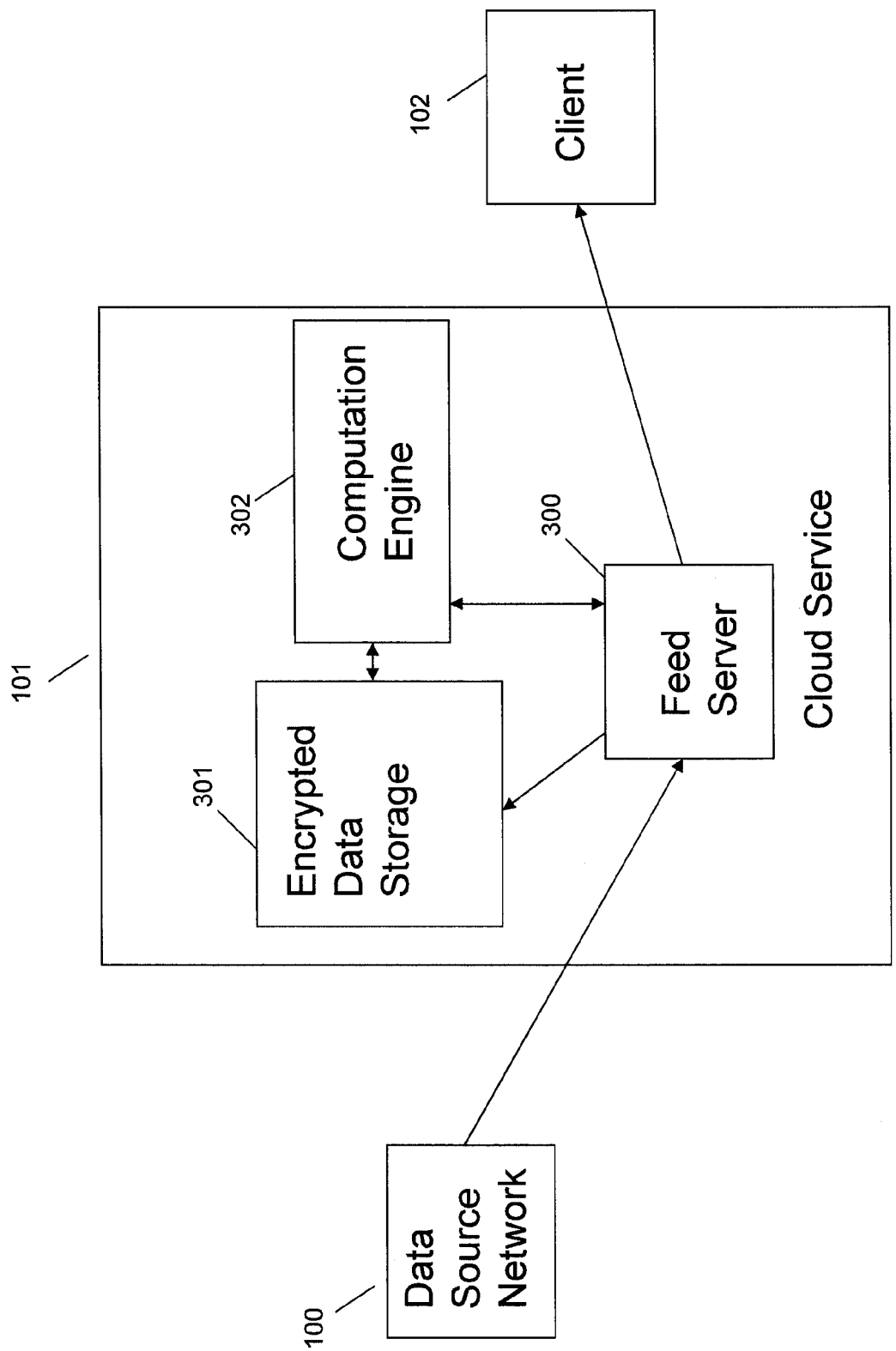
FIG. 3 illustrates a block diagram of a cloud service, according to one embodiment of the invention.

FIG. 3 illustrates a cloud service 101 and components contained therein, according to an embodiment of the invention. A feed server 300 receives data feeds, such as encrypted data from the aggregators in the data source network 100 and queries from the client 102. The feed server 300 may send the encrypted data from the aggregators to a data storage unit such as the encrypted data storage 301. The feed server 300 may also communicate queries from the client 102 to a computation engine 302.

The encrypted data storage 301 stores the encrypted data together with its metadata. It may also store results from computations made by the computation engine 302.

The cloud computation engine 302 performs computations on the encrypted data and returns the results to the feed server 300 to be sent to the client 102. The computation engine 302 may also determine which part of a computation that needs to be done to respond to a query can be done on the encrypted data, and which part needs to be done after decryption by the client. This determination is necessary since the cloud service does not receive a key from the key server 103, and so is unable to decrypt the encrypted data. Alternatively this determination can be made by the client. The computation engine 302 may also be responsible for carrying out a caching strategy in which the results of certain computations on encrypted data are stored.

Figure 4:
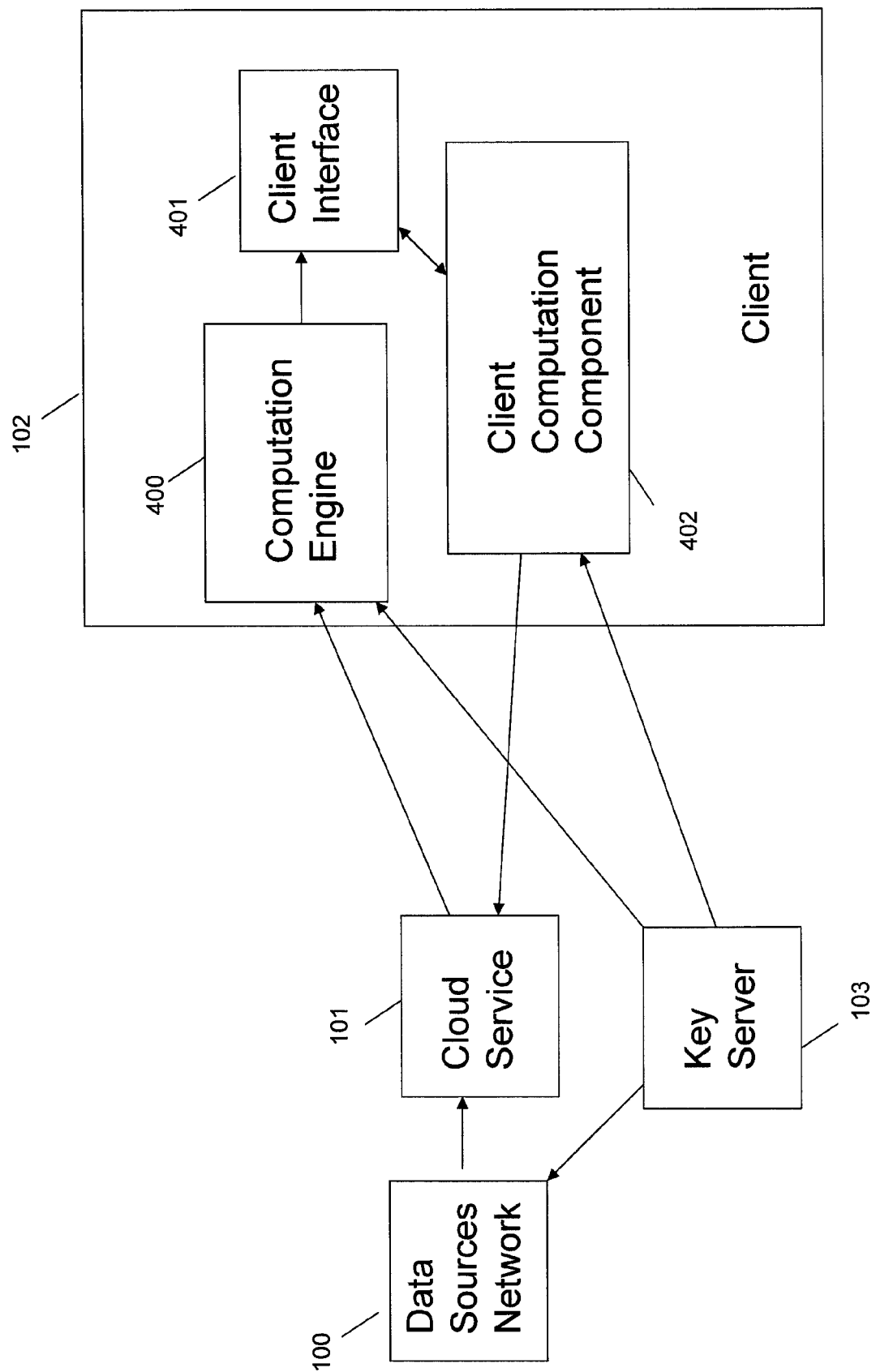
FIG. 4 illustrates a block diagram of a client network, according to one embodiment of the invention.

FIG. 4 illustrates a client network 102, which may be public or private, according to an embodiment of the invention. If the client network 102 is private, a private network-level computation engine 400 may receive the encrypted results of computations from the computation engine 302 at the cloud service that were passed through the feed server 300 en route to the private client network 102. The private, network-level computation engine 400 decrypts the encrypted results and, in one embodiment, may perform additional computation on the results. The results are then passed to a client interface 401 to present to one or more users. In one embodiment, if there are multiple private networks, there may be multiple private computational engines.

The client interface 401 enables users to enter queries relating to the data at the cloud service 101 or in the client network 102. The client interface 401 also presents information received from a client computational component 402 to one or more users. In one embodiment, a client computational component 402 may be provided. The client computational component 402 may act as the source of the queries, and may determine which parts of the computation needed to answer the query can be done on encrypted data in cases where the computation engine 302 in the cloud service is not making that determination.

In additional embodiments, the system architecture may be simpler in that multiple components may reside in one network or in one element. For example, in some cases it may be common for a raw data source, an aggregator, and a client interface to be located not only within the same network, but also within the same network element.

Figure 5:
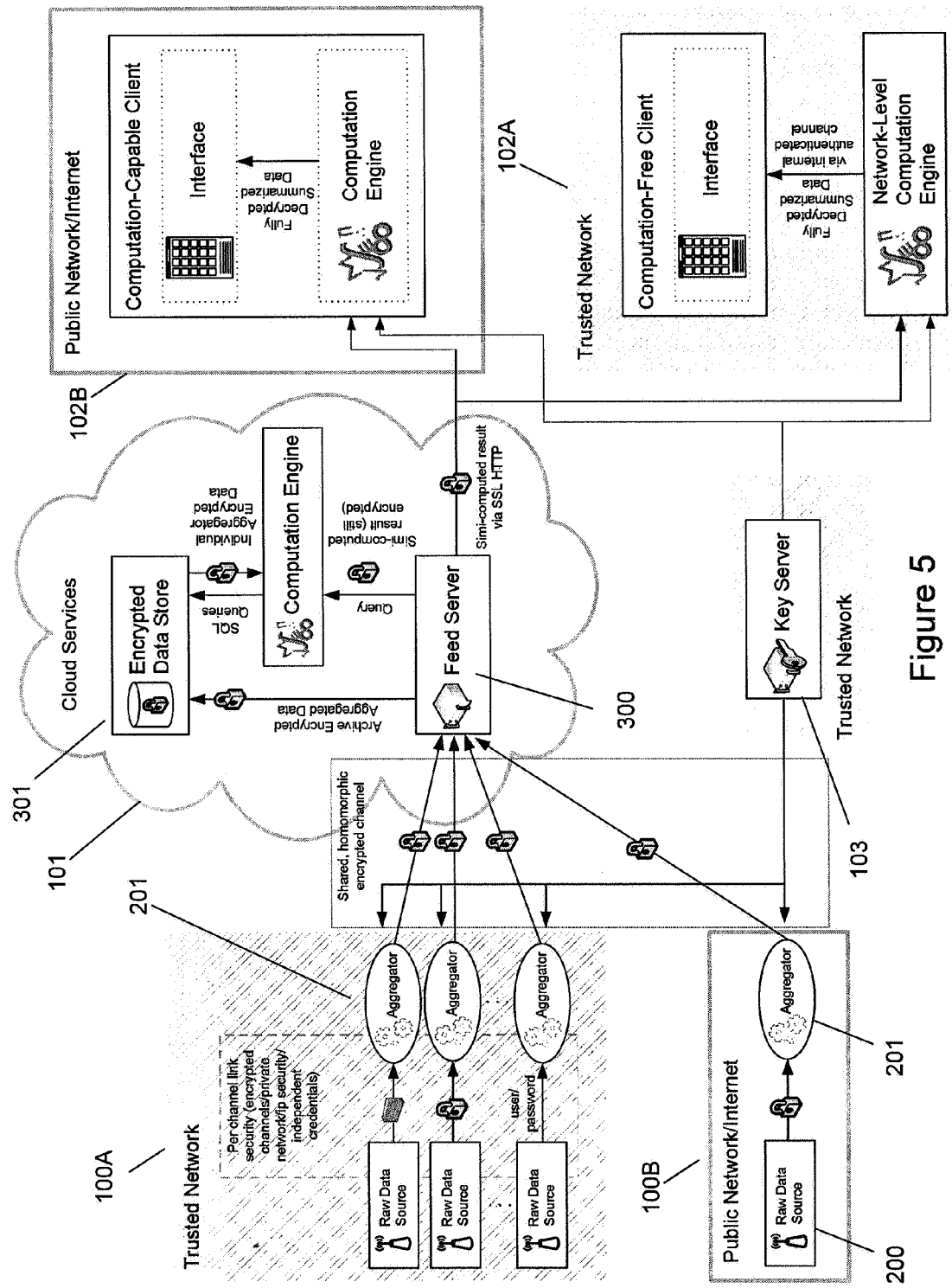
FIG. 5 is an illustration of a system architecture for managing encrypted data, according to one embodiment of the invention.

FIG. 5 is an illustration of a system architecture according to another embodiment of the invention. Specifically, the data source network may be a private, trusted data source network 100A or a public data source network 100B, either of which uses the aggregators 201 to encrypt raw data using a symmetric homomorphic encryption protocol. The third-party cloud service network 101 receives the encrypted data at the feed server 300, wherein as described above, it stores the encrypted data at the encrypted data storage component 301. The embodiment illustrated in FIG. 5 further shows how the client network may be a private, trusted client network 102A or a public client network 102B. In addition, the key server 103 is shown in a separate trusted network providing keys to the private, trusted networks 100A, 102A and public networks 100B, 102B, but not providing a key to the third-party cloud service network 101.

Figure 6:
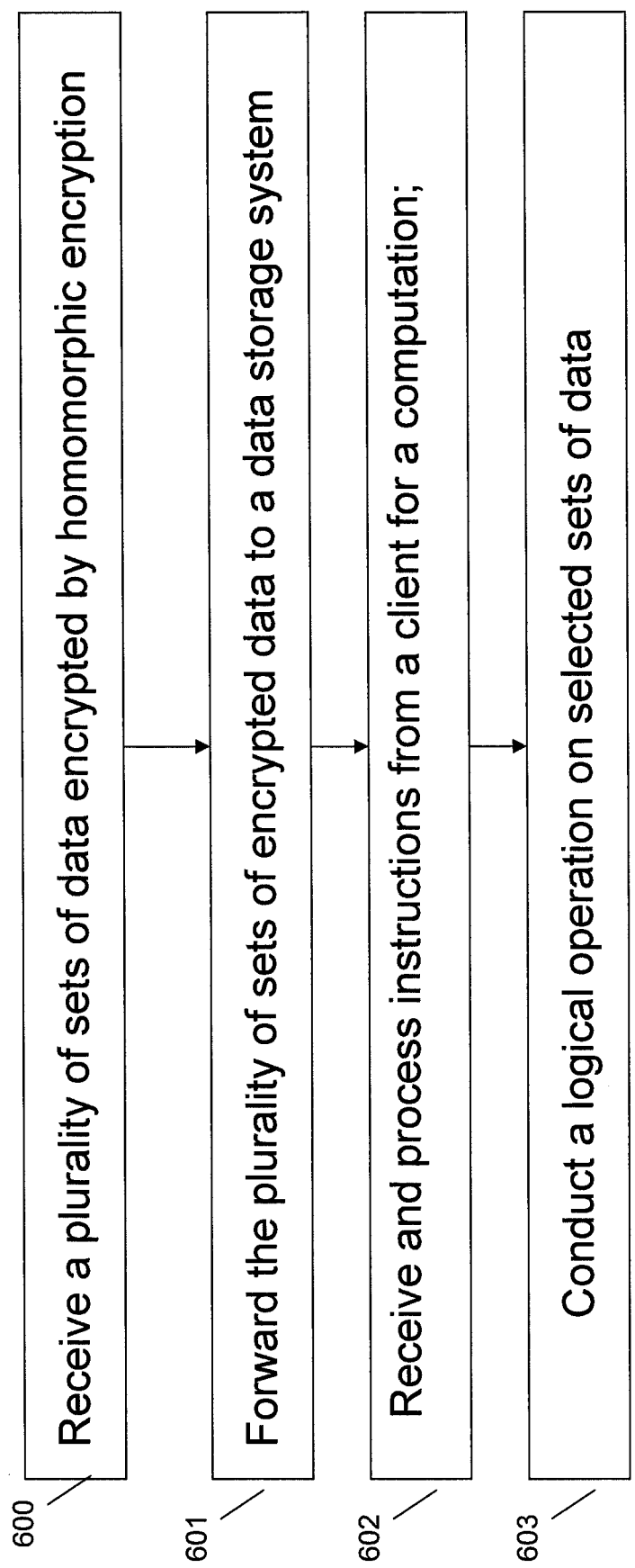
FIG. 6 is a flow chart illustrating a method of storing encrypted data at the cloud service and performing operations on the encrypted data at the cloud service, according to one embodiment of the invention.

FIG. 6 is a flow chart illustrating a method of conducting logical operations on encrypted data, according to one of the embodiments of the invention. First, the system receives a plurality of data encrypted by homomorphic encryption 600. Subsequently, the system forwards the plurality of encrypted data to a data storage system 601. Upon receiving and processing instructions from a client for performing a computation 602, the system may then conduct a logical operation on selected sets of encrypted data 603. The result generated may then be forwarded to the client.

Figure 7:
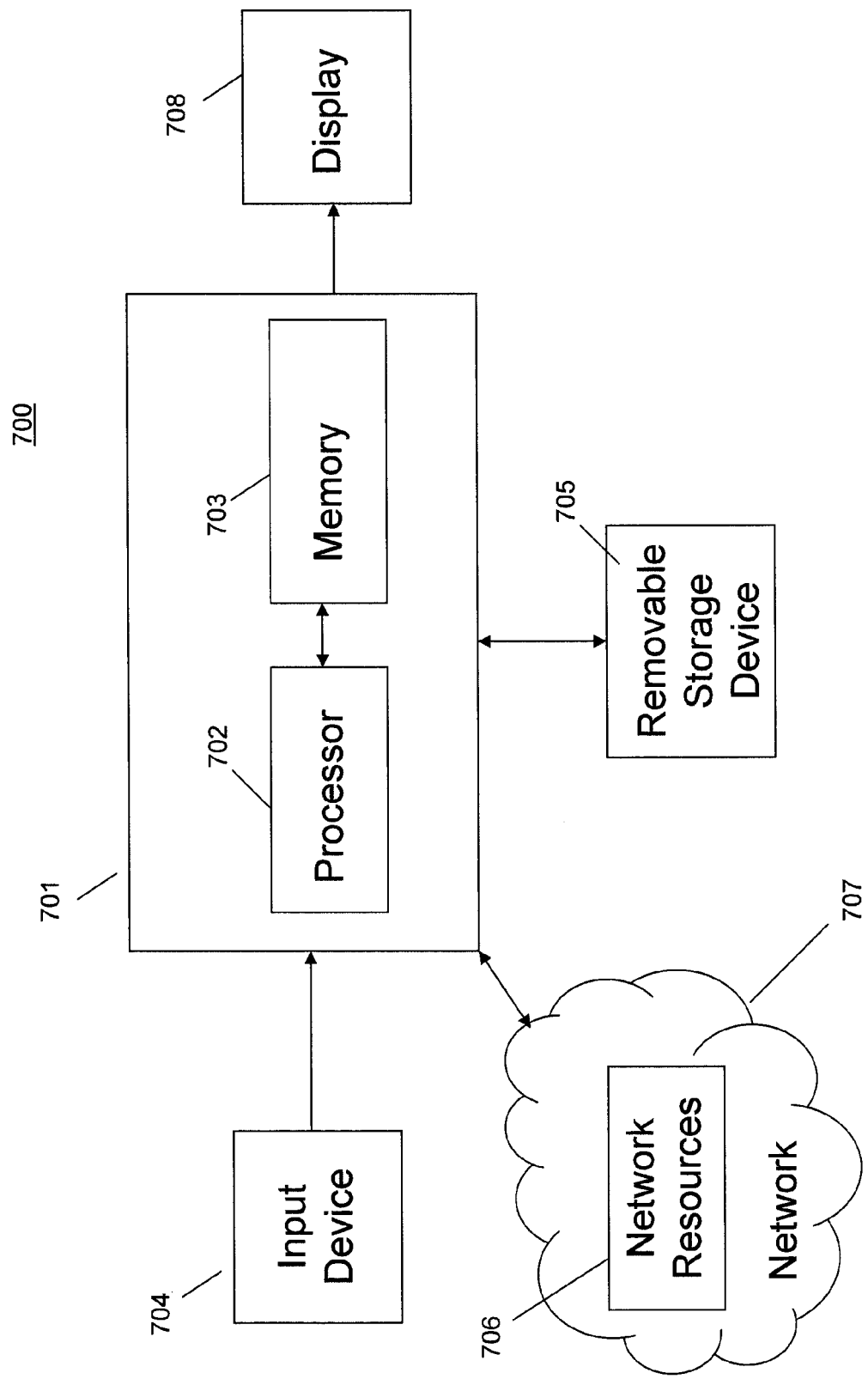
FIG. 7 is a block diagram of a computer system upon which the system may be implemented.

FIG. 7 is a block diagram that illustrates an embodiment of a computer/server system 700 upon which an embodiment of the inventive methodology may be implemented. The system 700 includes a computer/server platform 701 including a processor 702 and memory 703 which operate to execute instructions, as known to one of skill in the art. The term "computer-readable medium" as used herein refers to any medium that participates in providing instructions to processor 702 for execution. Additionally, the computer platform 701 receives input from a plurality of input devices 704, such as a keyboard, mouse, touch device or verbal command. The computer platform 701 may additionally be connected to a removable storage device 705, such as a portable hard drive, optical media (CD or DVD), disk media or any other medium from which a computer can read executable code. The computer platform may further be connected to network resources 706 which connect to the Internet or other components of a local public or private network. The network resources 706 may provide instructions and data to the computer platform from a remote location on a network 707. The connections to the network resources 706 may be via wireless protocols, such as the 802.11 standards, Bluetooth® or cellular protocols, or via physical transmission media, such as cables or fiber optics. The network resources may include storage devices for storing data and executable instructions at a location separate from the computer platform 701. The computer interacts with a display 708 to output data and other information to a user, as well as to request additional instructions and input from the user. The display 708 may therefore further act as an input device 704 for interacting with a user.

Interactions Between System Elements

In the sensor network embodiment of the invention described above, the interesting system elements are the (indirect) interactions between the aggregators, the computation engine, and the clients.

One embodiment is based on the one-time pad-based symmetric homomorphic encryption scheme of Castelluccia et al. The scheme used in this embodiment differs from that of Castelluccia et al. in that more than one entity has decryption power, encrypted values are stored, and a variety of queries can be asked and answered about the encrypted values. In addition, the key structure is used to enforce access restrictions.

In this particular embodiment, the Key Server 103 randomly chooses a general decryption key K and sends to each aggregator 201 keys $ek_i$ for each of the sensors (not shown) that an aggregator 201 is responsible for. In an alternative embodiment, in the case in which each aggregator 201 is responsible for a large number of sensors, each aggregator s 201 could be given a single encryption key $ek_s$, and the sensor ID could be included in the nonce. Some clients outside a private network may be given the general decryption key K, while others are given only the keys corresponding to the sensors they have access rights to. Similarly, the computation engine within each private network receives either the general key, or a set of encryption keys from the key server 103.

The aggregators 201 use the keys to encrypt the sensor data. Sometimes the data are encrypted in multiple forms, in order to enable more efficient or more powerful computation on the encrypted data. For example, the data may be encrypted using additive symmetric homomorphic encryption to facilitate addition of encrypted values, and using multiplicative symmetric homomorphic encryption to facilitate multiplication of encrypted values. As another example, the square of the data values may be encrypted to support the variance computations. The aggregators 201 send the encrypted sensor data to the feed server 300, which places the encrypted values in storage.

In one embodiment, the cloud computation engine 302 stores standard ongoing queries and proactively computes and sends efficient data aggregates that will be used by the computation engines to answer those queries. Clients 102 can also make queries which, possibly after processing by the private network computation engine 402, will be routed by the feed server 300 to the cloud's computation engine 302. The cloud's computation engine 302 processes the queries as much as it can using the encrypted data, and sends the computed results back to the private network computation engine 302 which, using the provided keys, decrypts the data and further processes the unencrypted data to obtain the full answer to the client query.

Examples are provided below which represent quantities that can be computed using encrypted data, according to the embodiments described above.

Computations on Encrypted Data

The system described above enables sums of data to be computed, as will be described below. In the sensor network embodiment described above, the sensor data must have been encrypted under an additive homomorphic scheme. A client 102 sends an expression to the cloud service 101 indicating the subset of data for which the client 102 would like the sum. The cloud service 101 computes the sum of the encrypted data entries and returns this encrypted version of the sum to the client 102. The client 102, in the meantime, computes the sum of the pads corresponding to the data points of interest and, upon receiving the encrypted sum from the cloud service 101, subtracts the computed sum of the pads from the encrypted total it just received. Similarly, the cloud service 101 can compute a weighted average of the encrypted values, and the client 102 can recover the unencrypted weighted average by subtracting the weighted average of the pads. While this system may not provide savings in terms of the amount of computation the client machine must perform, it does allow large amounts of data to be stored elsewhere, secure from a trusted but curious third party in view of its encryption. The system enables encrypted statistics across the data to be computed and sent to the user.

The ability to obtain the sum of subsets of the data immediately supports the computation of related quantities, including: 1) computing the total over a subset of data, 2) computing "or" on a subset of the data; 3) computing the mean over a subset of the data and 4) computing weighted averages over the data.

For example, when computing "or" on a subset of the sensor data, it may be desirable to know if any of a particular set of sensor readings is nonzero, which could indicate a malfunction. If the sum, after the client has decrypted the data by subtracting off the sum of the keys, is nonzero, there is a malfunction and further investigation is needed. A zero value sum indicates that everything is fine.

When computing the mean over a subset of the data, if the client knows N, the number of values in the subset, the client can compute the mean from the total by dividing by N. The total number of entries N may be known to the client already, or may be sent to the client by the cloud.

In computing weighted averages over the data, from the weights for various data points contributing to the weighted average, the client can compute the weighted average of the pads, and then subtract this value from the value returned by the cloud service to obtain the unencrypted weighted average.

Encrypting by multiplying by the pad, instead of by adding the pad, produces a multiplicatively homomorphic encryption scheme that supports the multiplication of encrypted values, and computation of entities such as the geometric sum.

Other Computations

Combinations of additions and multiplications can be obtained using multiple queries and some computation on the part of the client. How many queries and how much computation depends on the expression. Involved combinations of additions and multiplications may not be efficient in terms of the communication and computation cost. In some embodiments, additional information is encrypted in order to enable such a computation. A number of useful quantities can be easily and efficiently computed. For example, quantities such as the variance and standard deviation can be computed efficiently with encrypted data if the sensors compute, encrypt, and send the square of the value $m_i^2$ as well as the value $m_i$ itself: $Var_i = \Sigma m_i^2/n - Ave^2$. These encrypted values must also be stored at the cloud service, adding to the storage requirements. The need to separately store these values is due to the fact that this system is not both additively and multiplicatively homomorphic at the same time. In additional embodiments, other moments can be computed from additional encrypted data in an analogous fashion. Furthermore, many calculations require summing or averaging of values as an initial step. These initial calculations can be done by the cloud server on the encrypted data. Then the client can decrypt the data and finish the calculation. This division of labor between the cloud service and the client significantly extends the applications of this work.

Efficient Decryption and Complex Access Controls

As already described, the system supports some control over which clients can access which parts of the data. However, even more complex control can be attained. For example, by asking each aggregator to do a little more work, a client is able to decrypt a sum but not any of its components. This embodiment restricts the client's access to subdata, but also speeds up that client's decryption process in that it requires fewer calls to the pseudorandom function. Below is an example of how such a scheme works in a setting with one client and L aggregators, each encrypting one value $v_i$:

The key server sends Key $k_0$ to the client; Keys $k_i$ and $k_{i-1}$ to aggregator $A_i$, for $0<i<L$; and Key $k_{L-1}$ to aggregator $A_L$.

Except for the final aggregator $A_L$, each aggregator $A_i$ encrypts its value $v_i$ by subtracting $h(f_k(r))$ from $v_i$ for key $k=k_i$ and adding $h(f_k(r))$ for key $k=k_{i-1}$. The final aggregator $A_L$ adds only one such value, $h(f_k(r))$ for key $k=k_{L-1}$.

When the entire set of encrypted values is summed, all of the terms cancel out except for $h(f_k(r))$ for key $k=k_0$. Since the client has key $k_0$, it can decrypt the sum. Because the client doesn't have any of the other keys, it cannot decrypt any subtotal, let alone the individual encrypted values $v_i$. In other words, to perform this decryption, the client need only compute the one term, $h(f_k(r))$ for key $k=k_0$. In this embodiment, therefore, decryption is more efficient.

A similar approach can be used to obtain other even more complex access controls. In an additional embodiment, there are four sensor values, each encrypted by its own aggregator, and three clients, $C_1$, $C_2$ and $C_3$. The goal is to ensure that none of the clients can decrypt individual values. In this embodiment, client $C_1$ can only decrypt the sum of all of the values; client $C_2$ can decrypt two full sum and two subtotals of two values; and client $C_3$ can decrypt one of the subtotals of two values. This situation is handled as follows:

The key server sends key K to client $C_1$, keys K and $k_1$ to client $C_2$, key k to client $C_3$, keys K, k and $k_1$ to aggregator $A_1$, key $k_1$ to aggregator $A_2$, keys k and $k_2$ to aggregator $A_3$, and key $k_2$ to aggregator $A_4$.

Each aggregator $A_i$ encrypts its value $v_i$ by adding $h(f_k(r))$ from $v_i$ for the first key k listed, and subtracting $h(f_k(r))$ for any other keys it has.

When the entire set of encrypted values is summed, all of the terms cancel out except for $h(f_k(r))$ for key $k=K$. Both clients $C_1$ and $C_2$ can decrypt this sum. Client $C_2$ can also decrypt the sum of the first two sensor values, since it has key $k_1$. Client $C_3$ can decrypt the sum of the last two sensor values since it has key k.

These embodiments can be extended to include situations in which there are multiple sensor values per aggregator, more levels in the subtotal hierarchy, as well as more sensor values, aggregators, and clients.

EXAMPLE APPLICATIONS

There are many potential application areas for the aforementioned embodiments, of which two will be exemplified below. The examples described below relate to factory sensor data and awareness data. Other applications include accounting data, customer data, medical records, and user study data, although this list is not exhaustive by any means. These examples serve to illustrate various characteristics of the system according to one embodiment of the invention, but one skilled in the art will appreciate that various other embodiments will have numerous additional applications.

Example 1

Factory Monitoring (Boolean Case)

Goal: alert factory managers if sensor data suggests that something is awry. In particular, a sensor value out of a good range triggers an alert.

One of the most delicate and crucial parts of certain manufacturing processes is keeping very accurate temperature control throughout the process. Furthermore, the ideal temperature settings at different points in the process are often closely-held proprietary knowledge. For this reason, temperature sensors must constantly be monitored to make sure the temperatures stay within a good range.

Setup: Suppose there are M sensors. Let m be the smallest integer such that $M<2^m$.

Each sensor i sends its value to its aggregator. The sensor value $m_i$ can be represented to desired precision with p bits.

The aggregator stores the good range for values from each sensor. This good range may be constant, may depend on the time, or may depend on the process being carried out at that particular time (in which case the process ID and start time must be communicated to the aggregator). The aggregator also has received pseudorandom function key $ek_i$ from the key server. It produces a Boolean value $b_i$ that is 0 if the sensor value is in the good range, and a value of 1 otherwise. The key server and the aggregators also all agreed upon two hash functions (that do not need to be security grade, just uniform output) hb: $\{0,1\}^\lambda \to \{0,1\}^m$ and hx: $\{0,1\}^\lambda \to \{0,1\}p$ bits.

The nonce $r=r(t,a,\sigma)$ includes the time stamp t, a code a indicating the type of value (Boolean or raw sensor value), and may need an additional string $\sigma$ to fill it out to length $\lambda$.

The aggregator encrypts the Boolean value $b_i$ as $cb_i = b_i + hb(f_{ek(i)})(r(t,1,\sigma))) \mod M$, and the raw sensor value $m_i$ as $cx_i = x_i + hx(f_{ek(i)}(r(t,0,\sigma))) \mod P$, where $P=2^p$. Note that the values $hb(f_{ek(i)}(r(t,1,\sigma)))$ and $hx(f_{ek(i)}(r(t,0,\sigma)))$ can be computed ahead of time; in other words prior to receiving the sensor value.

The aggregator sends to the feed server a string with the concatenation of its node ID i, the encrypted Boolean ciphertext $cb_i$, and the encrypted sensor value $cx_i$.

The computational engine has a number of standing queries. For example, it may sum together, mod M, all of the encrypted Boolean values for a given process, and temporarily store these as $cp_j$. It may then sum together, mod M, all of the encrypted process totals for a given factory, and store these as $cf_k$. Finally, it may sum all of these together, mod M, and store this sum as cT. It then sends these sums to the feed server that, in one embodiment, sends them to the appropriate party's mobile device. For example, a chief operating officer governing several factories may receive the encrypted final total, followed by the encrypted factory totals, followed by the encrypted process totals. A manager of a factory may receive only the total for the manager's own factory, followed by the process totals for the processes at that factory. A process manager may receive only that process's total.

In one embodiment, when a monitoring mode is on, the mobile device computes the two one-time pads for the next time step for each standing query the mobile device owner has specified: $hb(f_{ek(i)}(r(t,1, \sigma)))$ and $hx(f_{ek(i)}(r(t,0, \sigma)))$. It then computes the sums mod P and mod M, respectively, of these pads for each query. For example, the factory manager will add together all the of the pads corresponding to each process at her factory, store those as $hp_j$, and then add them all together, and store this total as $hf_k$.

When the encrypted sensor values are received, the mobile device then decrypts the highest level Boolean sum, the factory total in the factory manager's case, by subtracting $hf_k$ from $cf_k$ mod M. If this total is zero, all sensors are in the good range, and the mobile device does nothing further. If the total is nonzero, the mobile device registers an alert and begins the process of gathering more information by decrypting the process totals to discovery which process or processes have sensor values outside the normal range. The mobile device then sends a query to the feed server requesting all of the sensor values for this process, and once received, graphically presents them to the user. The mobile device or the user may then change its standing queries in order to gain more information about this process in the subsequent time steps.

Comparisons With Non-Homomorphic Encryption Systems

With use of the system according to an embodiment of the invention, the Boolean value is encrypted as an m-bit string. While the ciphertexts for the Boolean values could be smaller in a non-homomorphic encryption scheme, the client must receive all data, not just the summary value, so for each time period the client would receive M bits, one for each sensor, which is larger than the m bits it receives per total it is interested in. Also, because the client can compute the sum of the pads ahead of time, the system utilized in this embodiment is also faster, as well as less bandwidth intensive; the time for the server to compute the sum of the encrypted values and transmit the sum is likely shorter than the time to transmit all of the values. In the factory monitoring case, the more often a sensor value is out-of-range and the client requests the raw values, the less of an advantage the system of this embodiment has. Finally, because the individual values are not decrypted in this embodiment, it is more secure. In the factory monitoring case, for example, the individual sensor values are never seen after they are first encrypted by the aggregator except when a problem is detected. Thus, this embodiment has advantages in terms of bandwidth, speed, and security.

Comparisons With Public Key-Based Homomorphic Systems

Deterministic public key encryption schemes such as RSA cannot achieve semantic security. Probabilistic variants of RSA using OAEP are not homomorphic. The best known probabilistic public key encryption scheme that is homomorphic is El Gamal. El Gamal will therefore be used for comparison. El Gamal requires choosing a large prime P. The length required depends on the security desired, but generally P is taken to be at least 1024 bits long. The ciphertext has two parts, each an integer mod P. Thus, even for Boolean values, the ciphertext would be at least 2048 bits long. Thus unless there were a huge number of sensors, the ciphertexts used are orders of magnitude smaller the ciphertext size used by El Camal. Other homomorphic encryption schemes have other various efficiency tradeoffs, but all have comparatively long ciphertexts. Encrypting, decrypting, and combining ciphertexts are all also substantially slower than for the scheme of this particular embodiment because the ciphertexts are longer, and because both encryption and decryption use exponentiation (an expensive computation). Furthermore, since everything is encrypted under one public key, everyone who can decrypt any data can decrypt all data. In contrast, the instant embodiment can use a different key for each sensor, providing a means to limit what data an individual can decrypt, while supporting computation across data encrypted under different keys. This capability can be given to a public key scheme through proxy re-encryption, but that substantially increases the complexity of the scheme. In summary, the system of this embodiment is more efficient in terms of bandwidth, and has faster encryption, decryption, and more flexible ciphertext combination. It also supports tailored data access without introducing additional complexity to the scheme.

Example 2

Factory Improvement Planning

Goal: determine which parts of the process have the highest deviations from the ideal value and which have the highest variance.

As mentioned in Example 1, it is critical to maintain the temperature within the correct range throughout certain manufacturing processes. Understanding where heat loss occurs, or when, where, and why hotspots or cold spots show up is crucial. To accomplish this, tracking these changes over time is necessary. Determining which parts of the process stray from the ideal value, or have high variance, enables the factory managers to decide where best to put effort into improving or replacing parts of the process.

Protocol: Suppose the statistics will be taken over at most T different time periods. Let t be the smallest integer such that $T<2^t$.

Each sensor i sends its value to its aggregator. The sensor value $m_i$ can be represented to desired precision with p bits.

The aggregator has received pseudorandom function key $ek_i$ from the key server.

The nonce $r=r(t,v,\sigma)$ includes the time stamp t, a code v indicating whether the nonce will be used to encrypt the raw sensor value or its square, and may need an additional string a to fill it out to length $\sigma$.

The aggregator computes $m_i^2$.

The aggregator encrypts the sensor value $m_i$ as $cm_i = m_i + hm(f_{ek(i)}(r(t,0, \sigma)))$ mod N, where N=PT, and the squared sensor value $m_i^2$ as $cv_i = m_i^2 + hv(f_{ek(i)}(r(t,1, \sigma)))$ mod N', where $N'=P^2T$. Note that the values $hm(f_{ek(i)}(r(t,0, \sigma)))$ and $hv(f_{ek(i)}(r(t,1, \sigma)))$ can be computed ahead of time, prior to receiving the sensor value.

The aggregator sends to the feed server a string with the concatenation of its node ID i, the encrypted Boolean ciphertext $cm_i$, and the encrypted sensor value $cv_i$.

The feed server places all of these values in the data store.

The client requests statistics for each sensor i over a time period t.

The computation engine totals all of the encrypted sensor values for sensor i in time period t, to obtain a total $S_i$. It also computes the total over all of the encrypted squared sensor values for the sensor in the same period to obtain a total $V_i$. The computation engine sends both $S_i$ and $V_i$ to the client.

While the computation engine is performing this computation, the client computes the sum over all of the pads for the encrypted values for this sensor in that time period, and also the sum of all the pads for the encrypted squared values for this sensor in that time period. It also knows how many values, n, are contained in this time period.

When the client receives the totals $S_i$ and $V_i$, it decrypts by subtracting off the pad sums it computed in the previous step, to obtain the unencrypted totals $s_i$ and $v_i$. The client can then compute the average value $Ave_i = \Sigma s_i/n$, and the variance $Var_i = \Sigma v_i/n - Ave^2$.

The client can then use these values to determine which parts of the process have average sensor values that deviate the most from the ideal, or have high variance, and put effort into tuning or replacing parts to improve these statistics in the future.

Comparisons With Non-Homomorphic Systems

As in Example Application 1, the approach in which the client decrypts is much less bandwidth efficient than the approach utilized by an embodiment of the invention. The greater the number of values over which the statistics are computed, the greater the advantage the system of this embodiment has. In addition, as before, the systems of this embodiment are also faster and more secure.

Comparison With Public Key-Based Homomorphic Systems

The ciphertexts used in the aforementioned embodiments of the invention have length t+p, where p is the precision and $t=\log_2 T$ for T, the maximum number of time periods over which statistics are computed. Thus, the ciphertexts used are shorter than 2048 bits even for double precision values taken every nanosecond and averaged over millennia. For example, double precision values taken every second and averaged over a year require ciphertexts of lengths that are less than 45 bits. Storing the encrypted version of both the raw value and its square requires 90 bits, which means the systems described in the previous embodiments are more than an order of magnitude more efficient in their use of storage. As mentioned with respect to Example 1, the system according to this embodiment of the invention performs faster encryption, decryption, and more flexible combinations of ciphertexts than the public key scheme, and supports fine-grained access restrictions to the data.

In an additional embodiment, examples 1 and 2 can be combined by replacing the encryption of the raw values in Example 1 with the somewhat less efficient encryption scheme of Example 2, or in other words, augmenting Example 2 with just the Boolean encryption part of Example 1.

Awareness Data Examples

Embodiments of the invention can be applied directly to existing awareness aggregation systems. Sensitive sensor-based information about users' behavior and actions could be securely encrypted before being sent to a central data store. The security of the information may be important at both a company and an individual level. Companies may want to protect information about the activities of their employees from the prying eyes of their competitors, or even their collaborators. Individual privacy may be important to employees. By centrally storing only encrypted data in a location, it is ensured that untrusted third parties cannot gain access to the highly-sensitive behavioral information. Further, by only supporting partial summarization and fusion of data at the cloud service level, it enables these services to be moved onto untrusted, commodity cloud services.

Example 3

Location Statistics on Awareness Data

Protocol: Let N be the number of people being tracked. Let M be the number of sensors, and p the precision of the sensor values. Let T be the maximum number of time periods over which any statistic will be computed, and W be the maximum weight that will be used in any weighted average.

For each sensor the aggregator processes, the aggregator creates a row containing a series of Boolean values, indicating for each person that a sensor tracks, whether that person was detected or not. In some cases, this Boolean value is the raw value from the sensor. In other cases, such as image detection from cameras, the aggregator may perform quite a bit of processing in order to obtain this value. In some cases, such as detecting computer activity, or a camera detecting motion in a given person's office, the series of values for a sensor may contain only one Boolean value, and that value, correctly or not, will be associated with the person who generally uses that computer or office. In other cases, such as Bluetooth sensors or RFID readers, Boolean values for multiple people will be returned. The aggregator will then encrypt this row of Boolean values as a row of r-bit strings, where r=n+m+p+t+w, and send these to the feed server. The feed server sends them to storage and processing by the computation engine.

The computation engine forwards the values relevant to each client's standing queries to each client. For example, a client may be interested only in the status of people in his or her work group, so only the values for those people are sent to the client. These the client can decrypt and deduce the state. Longer term statistics can also be computed for a variety of purposes, such as:

a. Location prediction: A user may be interested in where a colleague is likely to be at a future time period in order to try to talk with them face-to-face. The computation engine can compute a weighted average of the encrypted values for each of the person's possible locations at the same time in previous weeks, giving more recent weeks greater weight. Either the client already knows the weights, or the weights are sent to the client in the clear along with the encrypted weighted average. The client uses the weights to compute the weighted average of the pads, and subtracts this weighted sum from the value returned by the cloud service to obtain the decrypted weighted average for each location. The client can then present to the user the relative probabilities of that person's location at that time. If such queries are common, the computation engine can compute and store these weighted averages.

b. Location use statistics: The computation engine can compute the sum over the encrypted values for all people corresponding to a given location and pass it to a client who can decrypt the data to find this sum. In this way, the client can learn the total use of a space without learning anything about who is using it.

c. Workgroup location: By summing over encrypted values for locations for all people in a work group, statistics about the location of people in a work group can be given to a client without revealing any information about the location of specific members of the workgroup.

What is claimed is:

1. A system for storing and conducting logical operations on encrypted data, comprising:
a non-volatile storage system that stores the encrypted data, wherein the encrypted data is encrypted by symmetric homomorphic encryption; and
a computation engine comprising a processor;
wherein, in response to receiving a request to perform at least one logical operation on the stored encrypted data, the computation engine utilizes the processor to conduct the at least one logical operation on the encrypted data stored in the non-volatile storage system in order to produce an encrypted result, and to cause he encrypted result to be transmitted; and
wherein the encrypted data includes:
first data encrypted using a first key and a second key; and
second data encrypted using the second key.

2. The system of claim 1, further comprising a plurality of aggregators, each of the plurality of aggregators receiving and encrypting data received from at least one source, each of the plurality of aggregators forwarding the encrypted data to the non-volatile storage system.

3. The system of claim 1, wherein the symmetric homomorphic encryption comprises one-time pad based homomorphic encryption.

4. The system of claim 1, further comprising an archive encryption engine, the archive encryption engine conducting the encryption and forwarding the encrypted data to the non-volatile storage system.

5. The system of claim 2, wherein each of the plurality of aggregators utilizes at least one key for encrypting the data.

6. The system of claim 5, wherein the plurality of aggregators includes:
a first aggregator that encrypts the first data using the first and second keys;
a second aggregator that encrypts the second data using the second key.

7. The system of claim 1, wherein the first encrypted data includes a first pad from encrypting using the first key and a second pad from encrypting using the second key, and the second encrypted data includes third pad from encrypting using the second key, and wherein when the at least one logical operation is conducted, the second pad cancels the third pad so that the encrypted result is decryptable by the first key.

8. The system of claim 1, wherein the encrypted result is decryptable by a single key; and
wherein the encrypted data utilized in the logical operation is not decryptable by the single key.

9. The system of claim 1, wherein the at least one logical operation comprises taking a sum of at least two sets of encrypted data.

10. The system of claim 1, wherein the second data is encrypted with an encryption computation that uses the second key and the first data is encrypted with an inverse of the encryption computation that uses the second key so that the encryption computation that uses the second key offsets the inverse of the encryption computation that uses the second key.

11. The system of claim 1, further comprising:
a first client that obtains the first data;
a second client that obtains the second data; and
a communication unit that receives the encrypted first data and the encrypted second data that are stored in the non-volatile storage system.

12. A method for storage and conducting of logical operations on encrypted data in a third-party system, the method comprising:
receiving encrypted data including first encrypted data that is encrypted using a first key and a second key, and second encrypted data that is encrypted using the second key, wherein the encrypted data is encrypted using symmetric homomorphic encryption;
storing the encrypted data at a non-volatile storage system in the third-party system; and
utilizing, in response to receiving a request to perform at least one logical operation on the encrypted data stored in the non-volatile storage system, a processor in a computation engine in the third-party system to conduct the at least one logical operation in order to produce an encrypted result, and to cause the encrypted result to be transmitted.

13. The method of claim 12, wherein the encryption is conducted by an archive encryption engine.

14. The method of claim 12, further comprising:
aggregating and encrypting the first data at a first aggregator;
aggregating and encrypting the second data at a second aggregator; and
transmitting the first and second encrypted data to the third-party system.

15. The method of claim 12, wherein the symmetric homomorphic encryption comprises one-time pad based homomorphic encryption.

16. The method of claim 12, wherein the encrypted result is decryptable by a single key; and
wherein the encrypted data utilized in the logical operation is not decryptable by the single key.

17. The method of claim 12, wherein the first encrypted data includes a first pad from encrypting first data with the first key and a second pad from encrypting the first data with the second key, the second encrypted data includes a third pad from encrypting second data with the second key, and
wherein the at least one logical operation cancels the second pad and the third pad so that the encrypted result is decryptable by the first key.

18. A system for storing and operating on encrypted data, comprising:
a data storage system including a non--volatile memory; and
a computation engine;
wherein the data storage system receives and stores in the non-volatile memory a plurality of sets of data encrypted by homomorphic encryption, at least a set of encrypted data from among the plurality of sets of encrypted data being encrypted using more than one key;
where, in response to receiving a request to perform at least one logical operation on at least two sets of the encrypted data, the computation engine executes a process, using a processor, the process comprising:
selecting at least two sets of the encrypted data;
performing the at least one logical operation on the selected sets of encrypted data in order to produce an encrypted result; and
causing the encrypted result to be transmitted.

19. The system of claim 18, wherein the encrypted result is decryptable by a single key; and wherein the encrypted data utilized in the logical operation is not decryptable by the single key.

20. The system of claim 18, wherein each set of encrypted data includes one or more pads, the number of pads included in a set of encrypted data corresponds to the number of keys used to encrypt that set of data, and
wherein the at least one logical operation cancels out at least one pair of pads from included in the plurality of sets of encrypted data so that the encrypted result decryptable by a single key.

* * * * *